(12) United States Patent
Hall et al.

(10) Patent No.: US 7,497,001 B2
(45) Date of Patent: Mar. 3, 2009

(54) TECHNIQUE FOR PREDICTING OVER INSERTIONS FOR PARTIAL GRIDS AND DEFECTIVE Z-PINS

(75) Inventors: Terence F. W. Hall, Santa Monica, CA (US); Jonathan D. Bartley-Cho, Arcadia, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 500 days.

(21) Appl. No.: 11/288,832

(22) Filed: Nov. 29, 2005

(65) Prior Publication Data

US 2006/0288555 A1 Dec. 28, 2006

Related U.S. Application Data

(63) Continuation-in-part of application No. 11/158,400, filed on Jun. 22, 2005, now Pat. No. 7,409,757.

(51) Int. Cl.
*B23P 11/00* (2006.01)
*B23Q 17/00* (2006.01)

(52) U.S. Cl. .............. 29/407.01; 29/407.05; 29/407.08; 29/525.08; 29/798

(58) Field of Classification Search .............. 29/407.01, 29/407.05, 407.07, 407.08, 405, 432, 524.1, 29/525.01, 525.06, 798, 821, DIG. 46, 716, 29/243.53, 407.09, 407.1; 901/41; 156/92
See application file for complete search history.

(56) References Cited

U.S. PATENT DOCUMENTS

| | | | | |
|---|---|---|---|---|
| 3,440,117 A | * | 4/1969 | Bloch et al. | ................. 156/73.1 |
| 3,893,217 A | | 7/1975 | Edmond | |
| 4,631,685 A | * | 12/1986 | Peter | .......................... 700/212 |
| 4,882,836 A | | 11/1989 | Higuchi | |
| 4,882,837 A | | 11/1989 | Higuchi | |

(Continued)

FOREIGN PATENT DOCUMENTS

JP    58131528    8/1983

(Continued)

*Primary Examiner*—Jermie E Cozart
(74) *Attorney, Agent, or Firm*—Stetina Brunda Garred & Brucker

(57) ABSTRACT

In accordance with the present invention, there is provided a technique which may be used in conjunction with an automated Z-pin insertion process to automatically monitor the insertion energy applied to the Z-pins during the initial insertion phase of the automated insertion process, and compare it to an empirically derived value for good insertions, thereafter allowing the insertion process to continue to a predetermined additional insertion depth before terminating the process. The insertion energy is calculated by cumulatively summing the insertion force and multiplying it by the insertion time, thus yielding the cumulative energy. At a specified, predetermined insertion depth, the energy accumulation is stopped and the value at the initial insertion depth is stored and compared to an empirically derived value. If the value is less than the empirical value, the insertion energy is too low, thus indicating that either a partial grid insertion is being encountered or defective Z-pins are being inserted. Insertion is allowed to continue until another empirically derived second insertion depth is reached whereat the insertion is terminated. The second depth is necessary for the continued insertion of partial grids to ensure that the Z-pins are fully inserted. The second depth is a function of the laminate thickness to ensure full depth insertions.

20 Claims, 13 Drawing Sheets

U.S. PATENT DOCUMENTS

| | | |
|---|---|---|
| 4,884,329 A | 12/1989 | Higuchi |
| 5,396,703 A | 3/1995 | Rice |
| 5,832,594 A | 11/1998 | Avila |
| 5,919,413 A | 7/1999 | Avila |
| 6,027,798 A | 2/2000 | Childress |
| 6,049,970 A | 4/2000 | Reis et al. |
| 6,067,696 A | 5/2000 | Cecil et al. |
| 6,240,613 B1 | 6/2001 | O'Connor et al. |
| 6,267,149 B1 | 7/2001 | Yasui et al. |
| 6,276,050 B1 | 8/2001 | Mauer et al. |
| 6,490,775 B1 | 12/2002 | Juranitch et al. |
| 6,502,008 B2 | 12/2002 | Maurer et al. |
| 6,543,115 B1 | 4/2003 | Mauer et al. |
| 6,645,333 B2 | 11/2003 | Johnson et al. |
| 6,676,785 B2 * | 1/2004 | Johnson et al. ............... 156/92 |
| 2003/0100228 A1 | 5/2003 | Bungo et al. |
| 2005/0042023 A1 | 2/2005 | Jones |

FOREIGN PATENT DOCUMENTS

WO     WO 2004/041528     5/2004

* cited by examiner

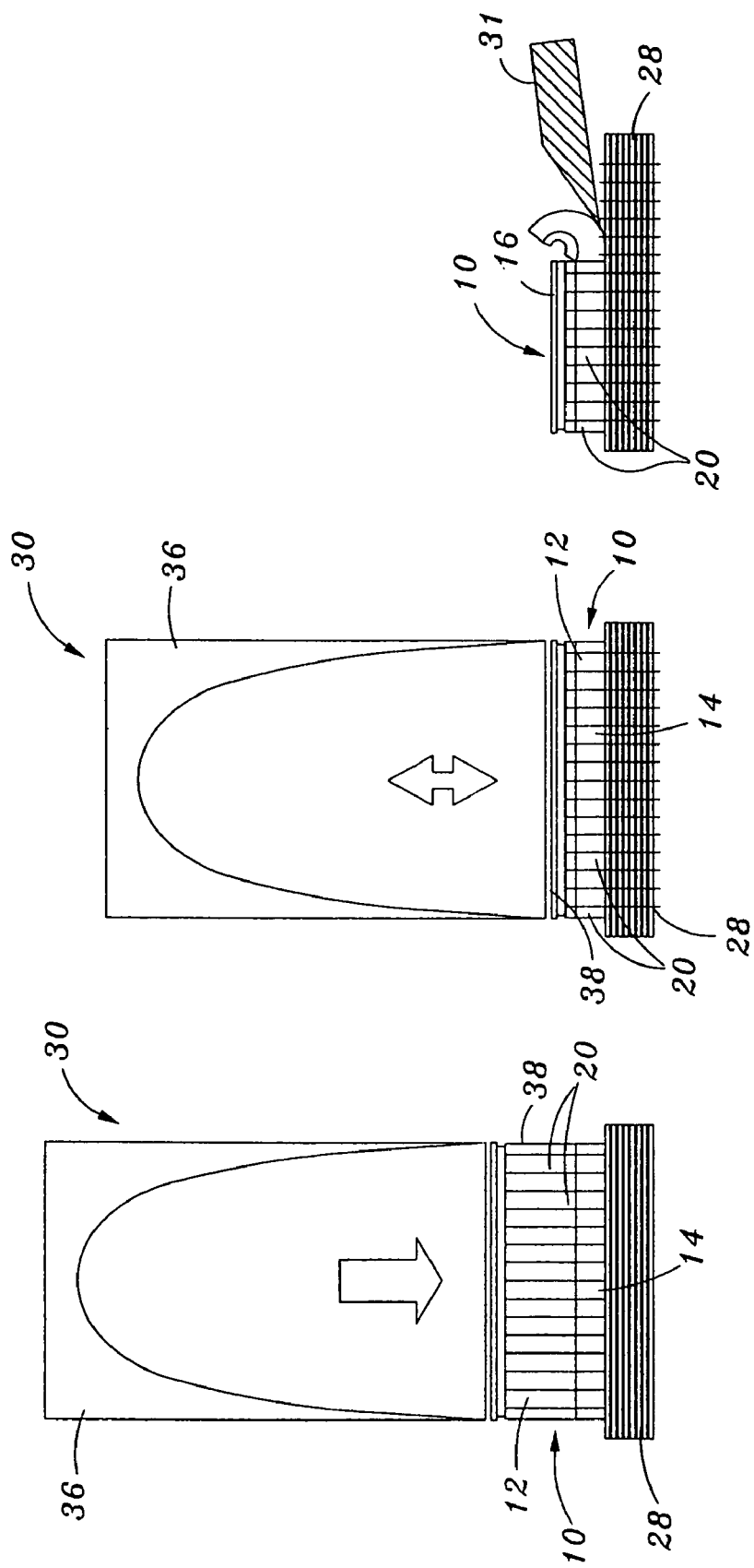

TECHNIQUE FOR PREDICTING OVER INSERTIONS FOR PARTIAL GRIDS AND DEFECTIVE Z-PINS

CROSS-REFERENCE TO RELATED APPLICATIONS

The present application is a continuation-in-part of U.S. application Ser. No. 11/158,400 entitled now U.S. Pat. No. 7,409,757 B2 AUTOMATED Z-PIN INSERTION TECHNIQUE USING UNIVERSAL INSERTION PARAMETERS filed Jun. 22, 2005, the disclosures of which are incorporated herein by reference.

STATEMENT RE: FEDERALLY SPONSORED RESEARCH/DEVELOPMENT

The invention disclosed in the present application was developed under a contract research and development (CRAD) program funded by the Office of Naval Research (ONR).

BACKGROUND OF THE INVENTION

The present invention relates generally to reinforced composites, and more particularly, to a two-speed insertion process for Z-pinning/joining uncured composite laminates to each other.

The use of composites as primary structures in aerospace applications is becoming increasingly widespread in the aerospace industry. Traditional composite materials are made up of a resin matrix material and a quantity of two-dimensional fibers, continuous in the X-Y axis direction, but laminated in layers to produce a material thickness. Composite material construction, wherein a fiber material such as a glass fiber, carbon fiber, or aramid fiber is combined with a matrix material, such as thermoplastic or thermoset resins, is an example of a traditional two-dimensional structure.

Many structural composites, such as structural composite air frames, usually include multiple stiffeners. The stiffeners supply rigidity and stiffness that is required under certain flight load conditions. One typical stiffener is referred to as a hat stiffener. Hat stiffeners, named for their shape, are typically applied to aerospace structural composite components via their skin.

Historically, composite hat stiffeners were attached to composite skins with conventional mechanical fasteners. In another attachment process sometimes employed, the hat stiffeners were co-cured to the skin of the structural composite material concurrently with the curing with the structural composite material itself. However, in both this process and that wherein the hat stiffeners were mechanically bolted and/or adhesively bonded to the skin, the failure mode typically occurred at the inner hat stiffener to skin surface.

In order to resolve the occurrences of failure using the aforementioned attachment processes, Z-pinning is now frequently used in the aerospace industry to facilitate the attachment of one or more stiffeners to a composite skin. In this regard, with the development of Z-pins, methods for supporting the Z-pins in a carrier, and methods for inserting the Z-pins into uncured composite materials, the hat stiffeners and skin are able to be joined to each other prior to being cured. Joining composite parts together with Z-pins offers several advantages over conventional mechanical fasteners, such as lighter weight, more even distribution of the load, lowers costs, and co-curing of the two parts. In one currently employed Z-pinning process used in conjunction with hat stiffeners, a Z-pin carrier pre-form is disposed on that surface of the hat stiffener which is to be secured to the skin of the underlying structural composite material or laminate. The pre-form typically comprises contiguous layers of low and high density foam having a multiplicity of Z-pins embedded therein. The Z-pins are forced from the carrier pre-form through the hat stiffener and into the underlying laminate using a device such as a hydraulic press or an ultrasonic device (e.g., an ultrasonically excited horn) which uses high frequency energy to vibrate the Z-pins within the carrier pre-form to force them through the stiffener and into the underlying laminate.

For purposes of achieving greater efficiencies and economies in the Z-pinning process, it is highly desirable to facilitate the insertion of the Z-pins automatically through the use of a robot. However, attempts at automating the Z-pinning process have proven challenging due to the need for special techniques to accommodate the many variables involved with the Z-pinning process. More particularly, the key variables for automated insertion are insertion speed, insertion force, material age, material thickness, amount of laminate hot debulking, amplitude of the excitation of the horn (when an ultrasonic horn is used), the load bearing capability of the Z-pins, and insertion time. Inserting the Z-pins too fast results in excessive force being applied to the pins, thereby crushing them, or causing them not to penetrate completely through the parts being joined. Inserting the Z-pins too slowly takes excessive time thereby not achieving a reasonable return on investment, or causes the pre-form to overheat which creates a potential for a fire hazard. When an ultrasonic horn is used, increasing the amplitude of the horn oscillation allows for faster insertion, but increases the risk for transferring too much energy into the pre-form causing over-insertion of the Z-pins and melting of the pre-form. Moreover, one set of conditions may be fine for a new material and a thin total thickness, but not optimal for an aged material (e.g., a thirty day age material) that is of a maximum thickness. Indeed, since many of the aforementioned variables interact in a non-linear fashion, it is extremely difficult to predict insertion success with any given combination. As an additional restriction, the insertion time is required to be fast enough to generate a good return on investment for the process. Thus, for automated Z-pin insertion in a production environment, there exists a need in the art for a single set of insertion parameters (universal parameters) which accommodate all the variations likely to be encountered within the specifications.

The need for a single set of insertion parameters for use in an automated Z-pin insertion process is addressed by Applicant's co-pending U.S. application Ser. No. 11/158,400 entitled AUTOMATED Z-PIN INSERTION TECHNIQUE USING UNIVERSAL INSERTION PARAMETERS filed Jun. 22, 2005, the disclosure of which is incorporated herein by reference. However, with currently known manual insertion processes, follow-up manual inspection steps are still typically required to verify that the Z-pins were inserted to the full, proper depth. More particularly, in manual inspection processes as currently practiced, the height of the Z-pin carrier pre-form is measured upon the completion of the insertion process through the use of a simple gage to determine if the Z-pins were pressed far enough into the composite laminate to reach full depth. The definition of full depth in this case means that the Z-pins have fully penetrated the composite laminate and reached the bond tool surface. Following cure, an additional visual check is performed to verify that the Z-pins did in fact penetrate the composite laminate ply closest to the tool surface. It is contemplated that a similar manual inspection process may be implemented in relation to the automated Z-pin insertion process/system described in Ser. No. 11/158,400 to verify that the Z-pins were inserted to full depth.

When implementing an automated Z-pin insertion process through the use of an ultrasonic horn and a Z-pin carrier pre-form, both full grid and partial grid Z-pin insertions usually occur. A full grid insertion occurs when the footprint of the entire anvil of the ultrasonic horn lies within or rests upon the exposed top surface of the carrier pre-form. A partial grid insertion occurs when a portion of the anvil extends beyond one of the sides or peripheral edge segments of the carrier pre-form. When inserting Z-pins into a composite structure through the implementation of an automated Z-pinning process, the corresponding robotic system is not able to detect the difference between a full grid and a partial grid insertion using only the load cell force feedback described with particularity in Ser. No. 11/158,400. Neither can the automated Z-pinning system detect when inferior Z-pins are present in the carrier pre-form. Inferior Z-pins are unable to carry the normal insertion forces exerted by the robotic system and thus often crumble instead of fully inserting into the underlying composite structure.

During normal full grid insertions, the automated Z-pinning systems described in the aforementioned related applications of Applicant work extremely well. However, at the beginning and end of each Z-pin carrier pre-form, a partial grid insertion usually occurs. The effect of inserting this partial grid is to cause over insertions, which typically causes one or more of the following conditions: (1) the Z-pins on top of the carrier pre-form are crushed, thus causing a blackening of the surface of the underlying substrate and creating a cosmetic problem; (2) the time to complete the insertion is increased, often to a maximum value of six seconds, thus wasting extra time for no purpose; (3) the carrier pre-form is heated up beyond normal, causing the low density foam (polystyrene) included therein to melt; and (4) the maximum insertion depth for the Z-pins is often reached, again wasting valuable time. Occasionally, the quality of the Z-pins themselves is questionable as they sometimes are unable to carry the insertion force even on a full grid insertion, thus causing the Z-pins to crumble and not fully insert. This tends to be a more serious problem than over insertion as it could result in the parts not being pinned with enough integrity to maintain structural strength in the joint. The present invention addresses these particular problems by providing a method of detecting the above-described undesirable conditions in a manner which will be described in more detail below.

BRIEF SUMMARY OF THE INVENTION

In accordance with the present invention, there is provided a system for facilitating a two speed insertion process for Z-pinning/joining uncured composite laminates to each other. The insertion process of the present invention employs the use of an ultrasonic horn which is used to deliver ultrasonic energy to the Z-pins within a Z-pin carrier pre-form. In the insertion process, the insertion speed is changed to a lower insertion speed based on the force resistance encountered during insertion, providing a tactile feedback system. No operator intervention is needed as the system adapts to the prevailing conditions. By using this two speed process, it is possible to insert Z-pins into a wider variety of composite laminate conditions that would be impossible using single speed insertion techniques.

The insertion process of the present invention effectively varies one or more of the above-described variables or parameters based on conditions that exist during the Z-pin insertion process. The process of the present invention effectively ignores the initial conditions or parameters of material age and thickness, in favor of monitoring the force applied to drive the Z-pins into the laminate and using this information to vary the insertion speed. In one embodiment of the present invention, the Z-pins are initially inserted at a rate of 0.25 inches per second, with the insertion speed immediately being dropped to 0.050 inches per second when the insertion force reaches forty (40) pounds. When the insertion force reaches fifty (50) pounds, it is assumed that the Z-pins are all the way through the laminate and contacting a hard tool surface (or barrier sheet).

As part of the insertion process of the present invention, the moment the ultrasonic horn contacts the pre-form is detected, with the readings for the first ten percent of the insertion being ignored to prevent false triggering. Additionally, production system safety conditions are also monitored as a back-up to the possibility that the fifty pound force trigger is not recognized during the insertion process. Other safety features which may be employed into the process of the present invention to terminate the insertion process include the length of time of insertion and the maximum distance traveled by the ultrasonic horn. If the maximum preset time is reached, the insertion is terminated. Similarly, if the maximum preset depth is reached the insertion is also terminated. One additional safety feature may involve remotely monitoring the temperature of the insertion horn. If the horn temperature exceeds a given threshold, the insertion process is stopped following the current insertion, and the horn allowed to cool before proceeding with further insertions.

Further in accordance with the present invention, there is provided a technique which may be used in conjunction with the automated insertion process described above to automatically perform a required full depth inspection and alert the robot operator should a non-acceptable insertion occur. As indicated above, the automated insertion process of the present invention employs the use of a set of universal insertion parameters, which in turn facilitate the implementation of a two-speed insertion process based on certain insertion force thresholds. The automated inspection technique of the present invention automatically checks to see if the insertion speed has dropped to the requisite lower level, and further whether the requisite final insertion force was achieved during the insertion process. These particular parameters are automatically checked by analyzing data as it is generated during the insertion process. More particularly, the automated inspection technique relies on the principle that an acceptable insertion is always produced when the insertion speed is reduced from the rate of 0.25 inches per second by achieving the forty pound insertion force threshold and the fifty pound insertion force limit threshold is also reached. For unacceptable Z-pin insertions, the first condition may be met, but the two conditions are never met.

Still further in accordance with the present invention, there is provided a technique which may be used in conjunction with the above-described automated insertion process to automatically monitor the insertion energy applied to the Z-pins during the initial insertion phase of the automated insertion process, and compare it to an empirically derived value for "good" insertions, thereafter allowing the insertion process to continue to a predetermined additional insertion depth before terminating the process. The insertion energy is calculated by cumulatively summing the insertion force and multiplying it by the insertion time, thus yielding the cumulative energy. At a specified, predetermined insertion depth, the energy accumulation is stopped and the value at the initial insertion depth is stored and compared to an empirically derived value. If the value is less than the empirical value, the insertion energy is too low, thus indicating that either a partial grid insertion is being encountered or defective Z-pins are being inserted. Insertion is allowed to continue until another empirically derived second insertion depth is reached where at the insertion is terminated. The second depth is necessary for the continued insertion of partial grids to ensure that the Z-pins are fully inserted. The second depth is a function of the laminate thickness to ensure full depth insertions.

These, as well as other features of the present invention, will be described in more detail below.

BRIEF DESCRIPTION OF THE DRAWINGS

These, as well as other features of the present invention, will become more apparent upon reference to the drawings wherein:

FIG. 2B is a side elevational view illustrating a portion of the ultrasonic horn of the insertion system and its orientation relative to one of the pre-forms just prior to the actual insertion of the Z-pins into an underlying laminate;

FIG. 2C is a side elevational view illustrating a portion of the ultrasonic horn of the insertion system and its orientation relative to one of the pre-forms just after the actual insertion of the Z-pins into an underlying laminate;

FIG. 2D is a side elevational view illustrating an excess Z-pin removal process which is completed subsequent to the insertion of the Z-pins into an underlying laminate;

DETAILED DESCRIPTION OF THE INVENTION

Figure 1:
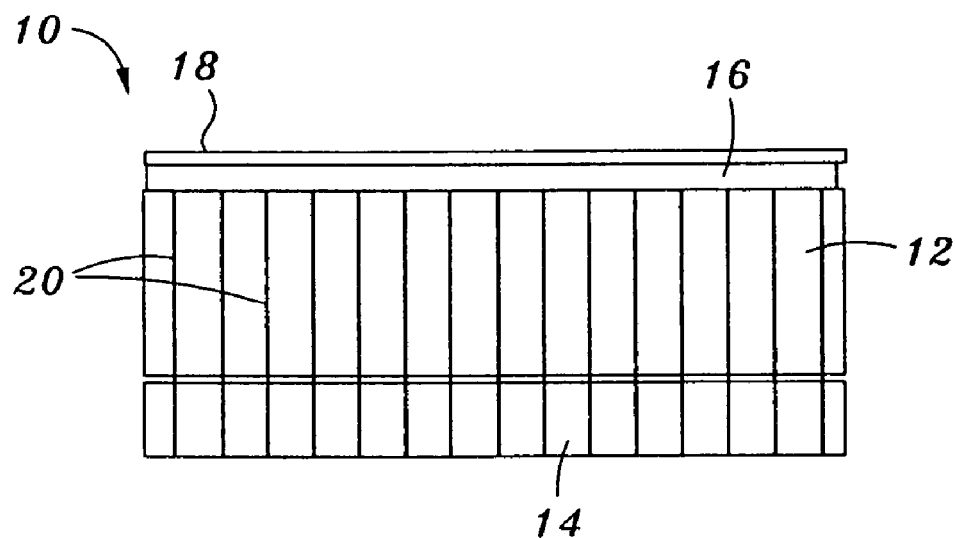
FIG. 1 is a cross-sectional view of an exemplary Z-pin carrier pre-form having a multiplicity of Z-pins embedded therein.
Figure 1A:
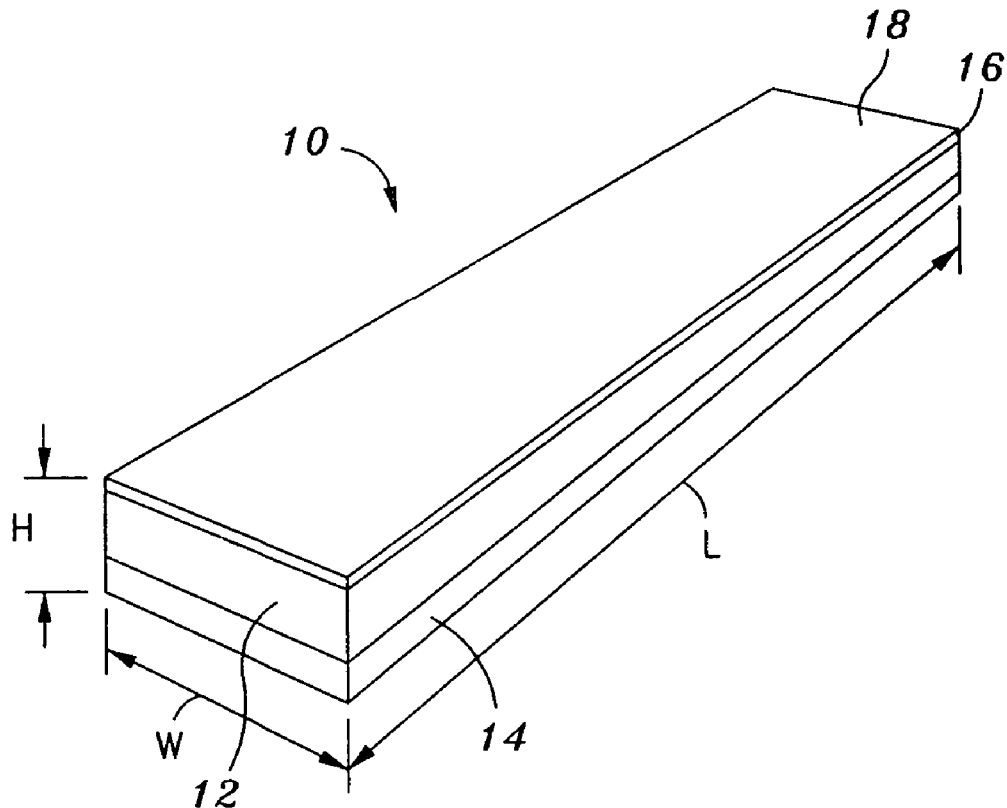
FIG. 1A is a top perspective view of the Z-pin carrier pre-form shown in FIG. 1.

Referring now to the drawings wherein the showings are for purposes of illustrating preferred embodiments of the present invention only, and not for purposes of limiting the same, FIGS. 1 and 1A provide cross-sectional and top perspective views, respectively, of an exemplary Z-pin carrier pre-form 10 which may be used in the Z-pinning process of the present invention as will be described in more detail below. The carrier pre-form 10 comprises an upper layer 12 of low density foam and a lower layer 14 of high density foam which is contiguous with the upper layer 12. In this regard, the top surface of the lower layer 14 is abutted against the bottom surface of the upper layer 12. Covering the top surface of the upper layer 12 is a layer 16 of polyolefin. The layer 16 is in turn covered by a layer 18 which is fabricated from paper. As such, the layer 16 is disposed between the layer 18 and the upper layer 12.

In addition to the layers 12, 14, 16, 18, the carrier pre-form 10 includes a multiplicity of Z-pins 20 which are embedded within the upper and lower layers 12, 14. More particularly, the Z-pins 20 extend generally perpendicularly between the top surface of the upper layer 12 (which is covered by the layer 16) and the exposed bottom surface of the lower layer 14. The Z-pins 20 also preferably extend in spaced, generally parallel relation to each other, and may be embedded within the upper and lower layers 12, 14 in any one of a multiplicity of prescribed patterns. Thus, the particular pattern or arrangement of Z-pins 20 as is shown in FIG. 1 is exemplary only in that the number, spacing and overall arrangement of the Z-pins 20 within the upper and lower layers 12, 14 is application specific. One commonly used material for the Z-pins 20 is boron, with another being graphite with cured bismaleimide (BMI) resin. As is seen in FIG. 1A, the carrier pre-form 10 has a generally rectangular configuration with a length L of approximately 12 inches, a width W of approximately 1.1 inches, and a height H of approximately 0.5 inches. However, those of ordinary skill in the art will recognize that the configuration of the carrier pre-form 10 as shown in FIG. 1A is also exemplary only in that such carrier pre-form 10 may be provided in any one of a multiplicity of different configurations depending on the particular application. An exemplary carrier pre-form 10 is provided under the trademark Z-Fiber™ from Aztex, Inc.

Figure 2:
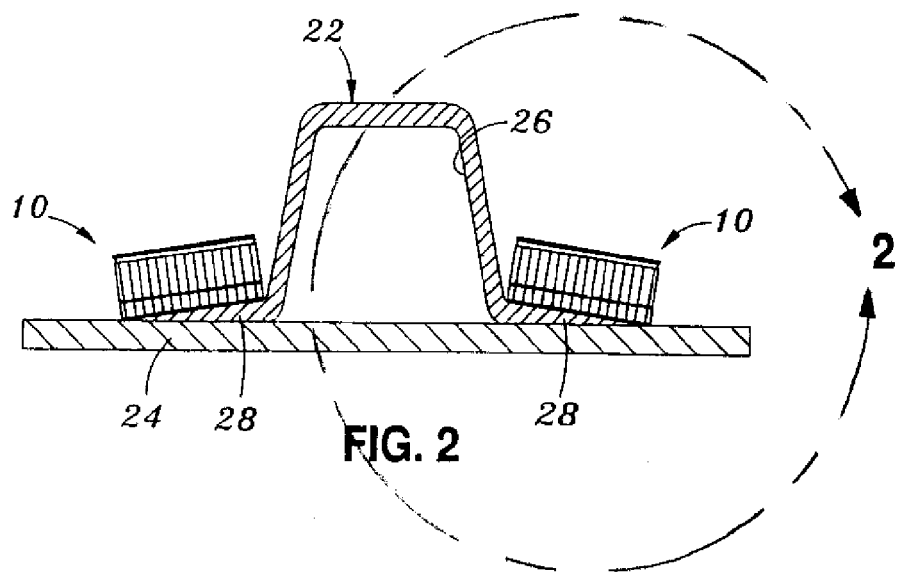
FIG. 2 is a cross-sectional view illustrating the manner in which carrier pre-forms are positioned upon a hat stiffener for securing the hat stiffener to an underlying laminate through the use of the insertion system and process of the present invention.
Figure 2A:
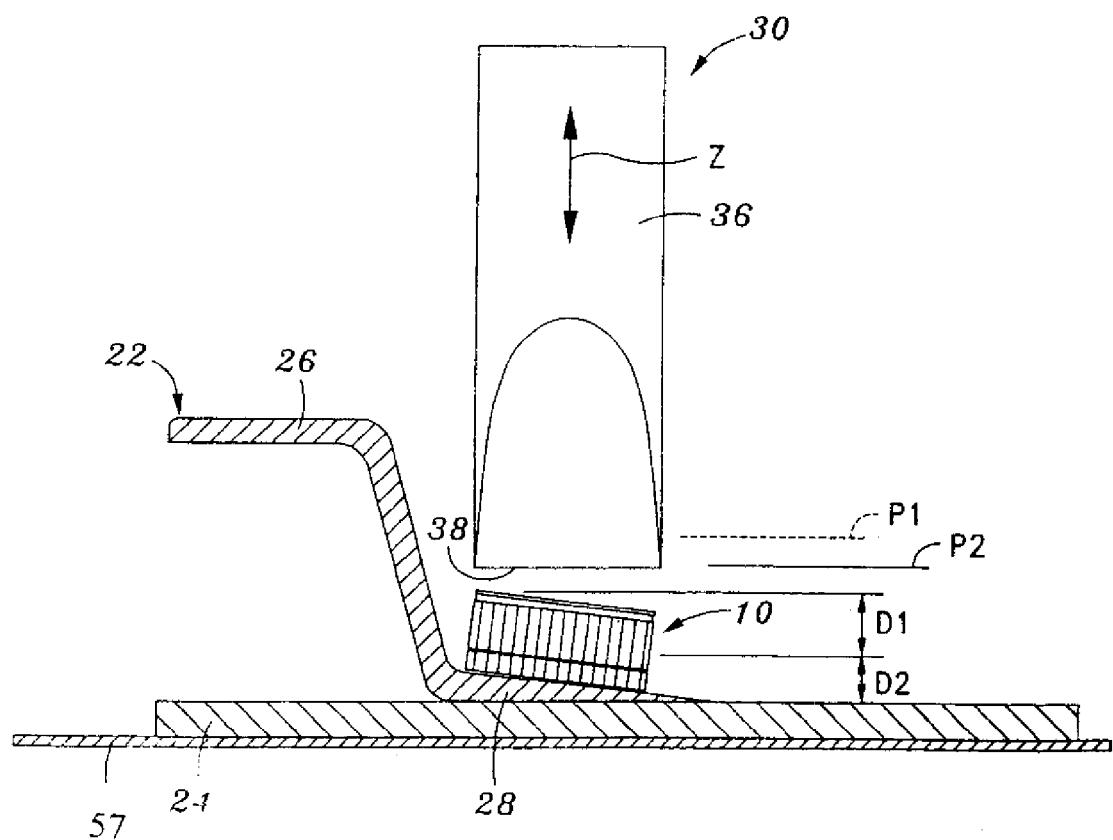
FIG. 2A is an enlargement of the encircled region 2 shown in FIG. 2, further illustrating a portion of the ultrasonic horn of the insertion system and its orientation relative to one of the pre-forms during the insertion process.

As indicated above, the Z-pinning system and process of the present invention is suited for use in joining uncured composite laminates to each other. Referring now to FIGS. 2 and 2A-2D, a typical application for the insertion system and process of the present invention is the attachment of a composite hat stiffener 22 to an underlying composite laminate 24. As is shown in FIG. 2, the hat stiffener 22 includes an elongate, enlarged central portion 26, and a pair of flange portions 28 which are integrally connected to and extend along respective sides of the central portion 26. Each flange portion 28 has a bottom surface which extends along and in contact with the top surface of the laminate 24. In addition to the bottom surface, each flange portion 28 includes a top surface which extends at a slight angle relative to the top surface of the laminate 24. As such, the thickness of each flange portion 28 is tapered. The angle of the top surface of each flange portion 28 relative to the top surface of the laminate 24 as shown in FIGS. 2 and 2A is approximately twelve degrees. Though the Z-pinning system and process of the present invention will be described below specifically in relation to the attachment of the hat stiffener 22 to the laminate 24, those of ordinary skill in the art will recognize that such system and process is suited for use in securing any composite laminate structures to each other, and is not limited to use in securing the hat stiffener 22 to the laminate 24.

Figure 3:
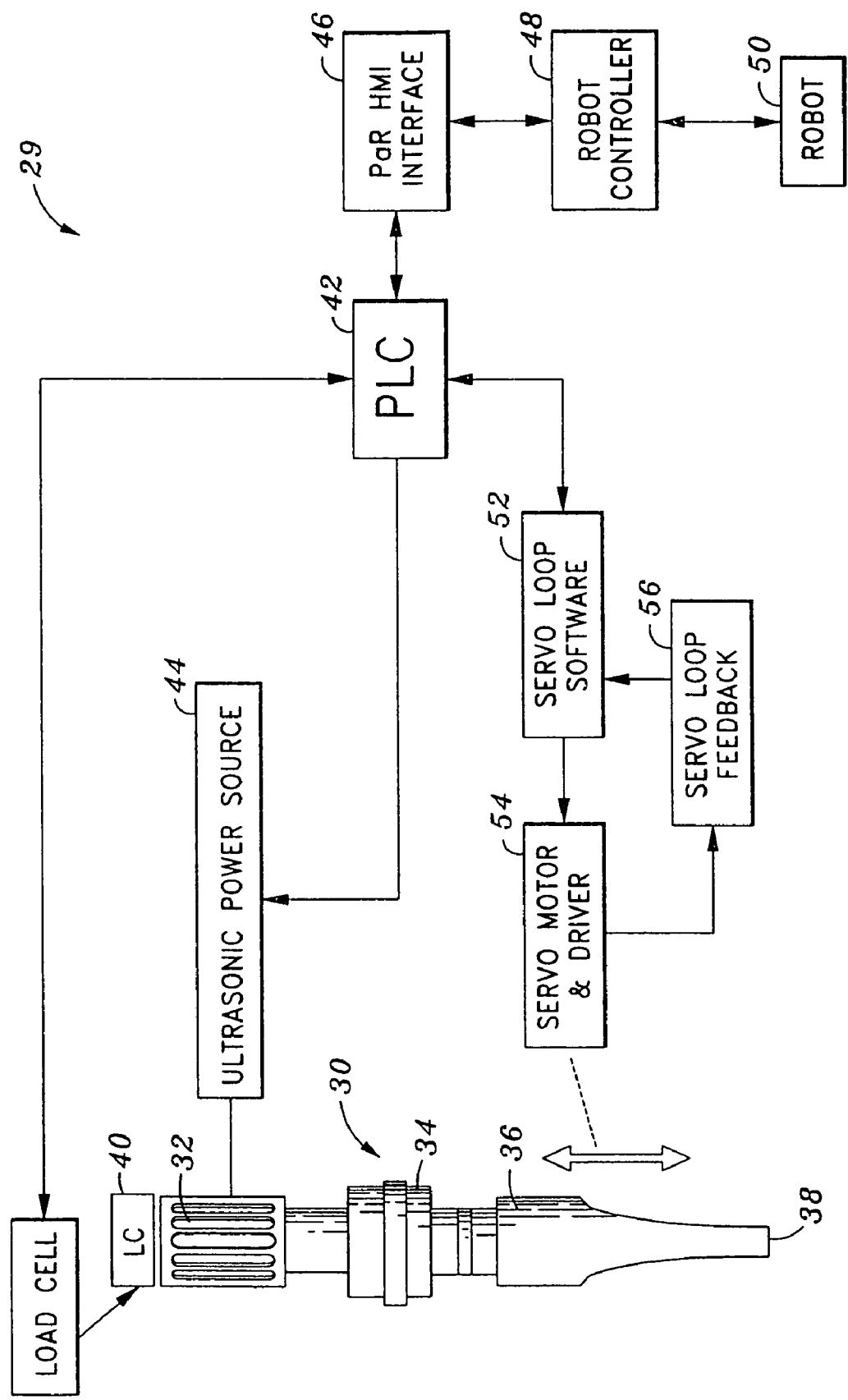
FIG. 3 is a schematic depiction of the various components included in the insertion system used to facilitate the insertion process of the present invention.
Figure 4B:
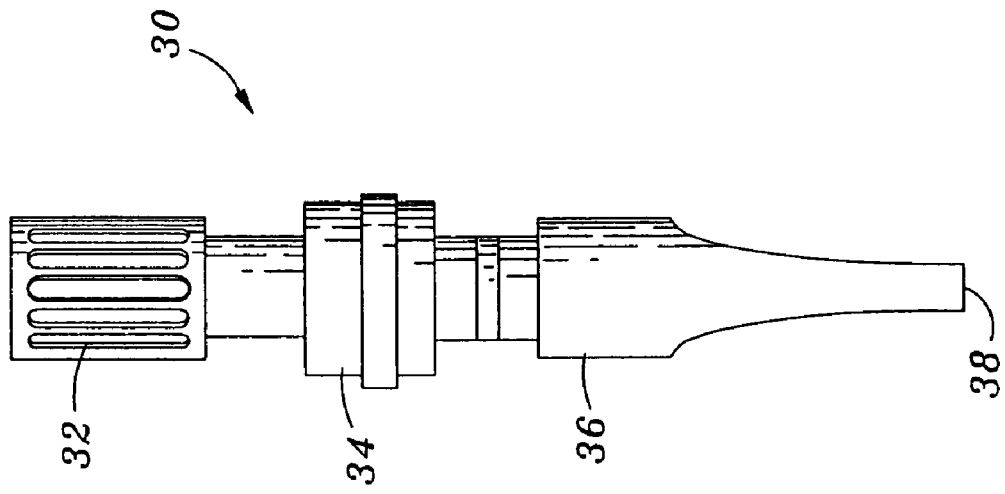
FIGS. 4A and 4B are side and end views, respectively, of the ultrasonic horn of the insertion system used to facilitate the insertion process of the present invention.
Figure 4A:
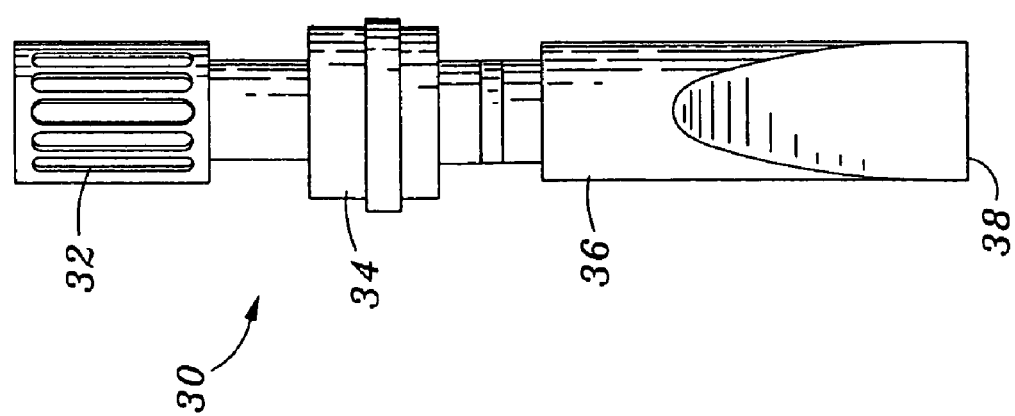

Referring now to FIG. 3, there is provided a schematic depiction of the various components included in the insertion system 29 used to facilitate the Z-pinning process of the present invention. In a preferred embodiment, the system 29 includes an ultrasonic horn 30 which is shown with particularity in FIGS. 4A and 4B. The ultrasonic horn 30 includes a converter 32 which is operatively coupled to a booster 34. The booster 34 is in turn operatively coupled to an insertion horn 36, the distal end of which defines a generally planar anvil 38.

In addition to the ultrasonic horn 30, the system 29 includes a load cell 40 which is disposed adjacent to the converter 32 of the ultrasonic horn 30 and is in electrical communication with a programmable logic controller (PLC) 42. The PLC 42 is also in electrical communication with an ultrasonic power source 44, which in turn electrically communicates with the converter 32 of the ultrasonic horn 30. Further, the PLC 42 is outfitted with a human/machine interface (HMI) 46 which in turn communicates with a robot controller 48. The robot controller 48 electrically communicates with a multi-axis robot 50 which is operatively coupled to the ultrasonic horn 30 in a manner wherein the robot 50 is able to control and regulate the movement of the ultrasonic horn 30 relative to the composite laminates which are to be secured to each other through the use of the insertion/Z-pinning process of the present invention.

Referring again to FIGS. 2 and 2A-2D, in using the system 29 depicted in FIG. 3 to facilitate the attachment of the hat stiffener 22 to the laminate 24, it is contemplated that carrier pre-forms 10 will initially be positioned upon the top surfaces of the flange portions 28 of the hat stiffener 22. Thereafter, the PLC 42 communicates with the robot 50 in a manner causing the robot 50 to effectively maneuver the anvil 38 of the ultrasonic horn 30 to a prescribed location or position relative to one of the carrier pre-forms 10. More particularly, the robot controller 48 causes the robot 50 to maneuver the anvil 38 of the ultrasonic horn 30 to a first position P1 (shown in FIG. 2A) which is approximately 0.200 inches above one of the carrier pre-forms 10. Subsequent to this initial positioning, the PLC 42 directs the robot 50 to actuate the anvil 38 to a second position P2 which is approximately 0.100 inches above the adjacent carrier pre-form 10. The movement of the anvil 38 to the second position P2 triggers the start of the insertion process of the Z-pins 20 from within the carrier pre-form 10 through the corresponding flange portion 28 of the hat stiffener 22 and into the underlying laminate 24.

As the Z-pinning process commences, the ultrasonic horn 30 is moved downwardly along a vertical axis Z (shown in FIG. 2A) by the robot 50 such that the anvil 38 comes into direct contact with a portion of the carrier pre-form 10 in the manner shown in FIG. 2B. The downward movement along the axis Z is continued so as to cause the anvil 38 to exert downward pressure to those Z-pins 20 of the carrier pre-form 10 which are positioned directly below the anvil 38. As will be recognized, the combination of mechanical motion (i.e., the downward movement of the ultrasonic horn 30 along the axis Z) and ultrasonic energy generated by the ultrasonic horn 30 effectively drives the Z-pins 20 from the carrier pre-form 10 into and through the hat stiffener 22, while at the same time crushing the upper layer 12 of low density foam as seen in FIG. 2C. The lower layer 14 of high density foam which is contiguous with the upper layer 12 is typically not crushed by the downward movement of the anvil 38. During the Z-pin insertion process, the force applied to the carrier pre-form 10 by the anvil 38 to drive the Z-pins 20 through the corresponding flange portion 28 of the hat stiffener 22 and into the underlying laminate 24 is monitored by the load cell 40 which, as indicated above, is in electrical communication with the PLC 42. The data transmitted to the PLC 42 by the load cell 40 is used to vary the insertion speed of the Z-pins 20. As will be recognized, the insertion speed corresponds to the rate of travel of the ultrasonic horn 30, and hence the anvil 38, downwardly along the axis Z.

In accordance with one embodiment of the Z-pinning/insertion process of the present invention, the ultrasonic horn 30 is actuated downwardly along the axis Z by the robot 50 such that the anvil 38 acts against certain ones of the Z-pins 20 of the adjacent carrier pre-form 10 in a manner causing them to be initially inserted through the corresponding flange portion 28 and into the underlying laminate 24 at a rate of approximately 0.25 inches per second. The insertion rate of the Z-pins 20 at approximately 0.25 inches per second typically takes place over a first distance D1 which is shown in FIG. 2A.

Figure 5:
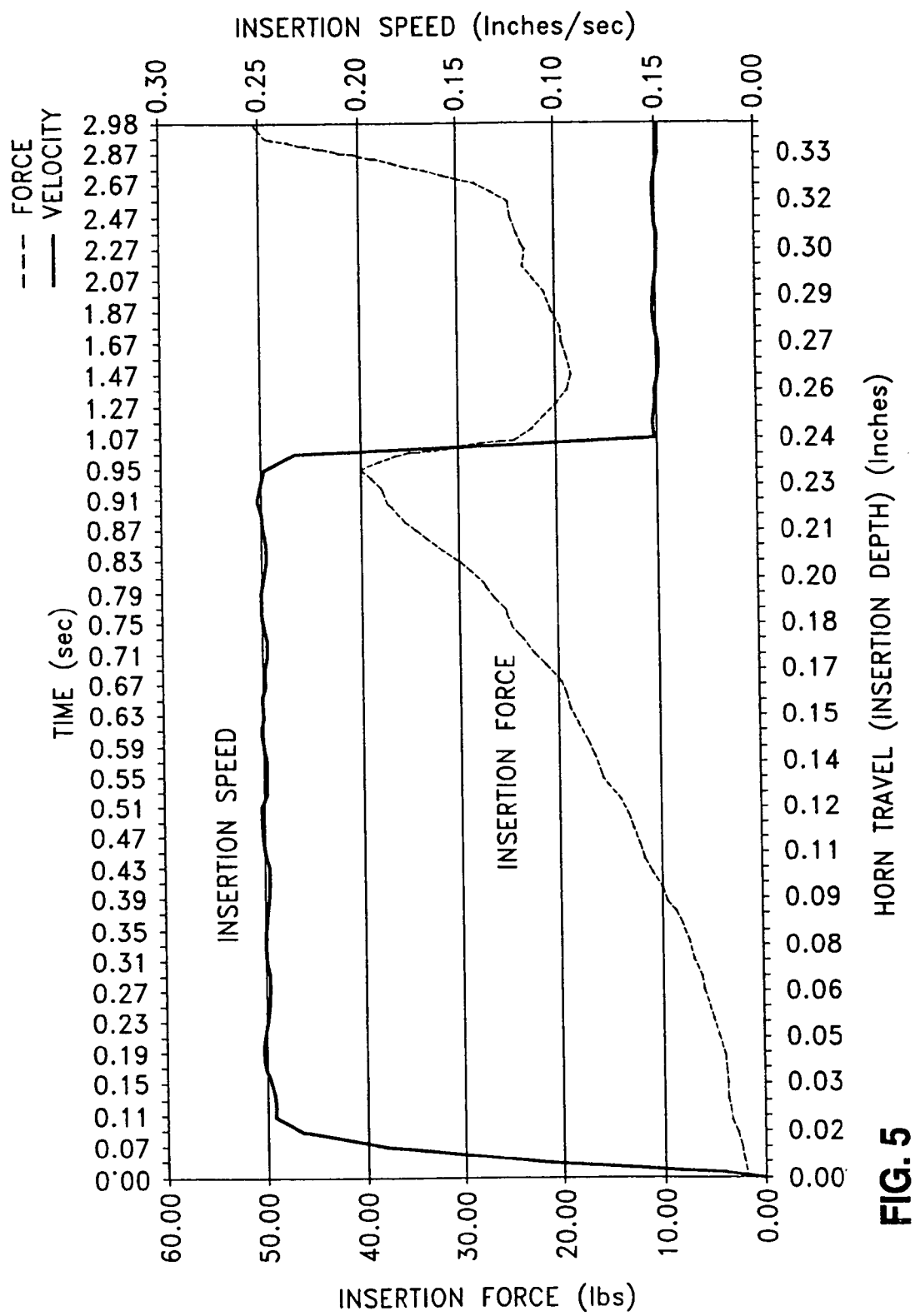
FIG. 5 is a graphical depiction illustrating the interrelationship between insertion force and insertion speed achieved through the use of the insertion process of the present invention.

When the data transmitted by the load cell 40 to the PLC 42 indicates that the amount of insertion force being applied by the ultrasonic horn 30 to the Z-pins 20 reaches forty pounds, the downward rate of travel of the ultrasonic horn 30 along the axis Z by the robot 50, and hence the insertion speed, is immediately dropped to approximately 0.050 inches per second. The insertion rate of the Z-pins 20 at approximately 0.050 inches per second typically takes place over a second distance D2 which is also shown in FIG. 2A. At this time, the load cell 40 continues to transmit data to the PLC 42 representative of the level of downward force being applied to the Z-pins 20 within the carrier pre-form 10 by the anvil 38. When the force reaches a level of approximately fifty pounds, it is assumed that the Z-pins 20 have been downwardly driven from the upper and lower layers 12, 14 of the carrier pre-form 10, through the corresponding flange portion 28 of the hat stiffener 22, and all the way through the underlying laminate 24 into contact with a hard tool surface or barrier sheet 57. The interrelationship between the insertion force and insertion speed is graphically depicted in FIG. 5. Once all of the Z-pins 20 have been driven from the carrier pre-form 10 through the flange portion 28 and into the underlying laminate 24, the crushed remainder of the carrier pre-form 10 (including excess portions of the Z-pins 20) is typically removed through the use of a chisel 31 or similar removal device as shown in FIG. 2D.

The variability in the insertion speed as described above in relation to the Z-pinning/insertion process of the present invention is regulated by servo loop software 52 which is programmed into the PLC 42. The servo loop software 52 is adapted to regulate the function of a servo motor 54, and precisely controls/regulates the movement of the ultrasonic horn 30 and hence the anvil 38 upwardly and downwardly along the axis Z. The robot 50 positions a robot end effector in a prescribed manner, then "freezes" its position and passes control of the insertion process to the end effector (which is where the drivers for the PLC 42, ultrasonic horn 30 and servo motor 54 are located). After completing the insertion, the end effector passes control back to the robot 50 for positioning for the next insertion. Servo loop feedback 56 transmitted to the servo loop software 52 by the servo motor 54 is, in conjunction with the data transmitted to the PLC 42 and hence the servo loop software 52 by the load cell 40, used to facilitate the above-described two-speed insertion process and to provide certain safety features which will be discussed in more detail below. The servo loop feedback 56 and data transmitted by the load cell 40 collectively provide a tactile feedback mechanism which effectively regulates the insertion process in the above-described manner.

Further in accordance with the Z-pinning/insertion process of the present invention, it is contemplated that the Z-pin insertion system 29 shown in FIG. 3 may be outfitted with components which allow for the detection of the moment when the anvil 38 defined by the insertion horn 36 contacts the pre-form 10. In this regard, the servo loop software 52 programmed into the PLC 42 may be adapted to ignore the readings (i.e., the data transmitted from the load cell 40 and/or the servo loop feedback 56) for approximately the first ten percent of the insertion of the Z-pins 20 to prevent false triggering. It is also contemplated that certain production system safety conditions may be monitored as a back-up in the event the fifty pound force trigger which would otherwise terminate the insertion process is not recognized by the PLC 42. Other safety features which may be integrated into the system 29 (e.g., programmed into the PLC 42) to terminate the insertion process include the length of time of insertion and the maximum distance along the axis Z traveled by the ultrasonic horn 30 and hence the anvil 38. In this regard, if a maximum preset time is reached, the insertion may be terminated. Similarly, if a maximum preset depth is reached as dictated by the travel distance of the anvil 38 along the axis Z, the insertion may also be terminated.

Still further, it is also contemplated that the temperature of the insertion horn 36 may be monitored as an additional safety feature. In this regard, if the temperature of the insertion horn 36 exceeds a given threshold, the insertion process for the Z-pins 20 may be stopped following the current insertion, with the insertion horn 36 being allowed to cool before proceeding with further insertions. The insertion graph depicted in FIG. 5 may also be used as a record that the Z-pins 20 fully penetrated the flange portions 28 of the hat stiffener 22 and the underlying laminate 24, thereby eliminating any need for manual inspection by an inspector. A software program could also be written and programmed into the PLC 42 to automatically determine whether all the Z-pin insertions were good (i.e., fully penetrated), with a message being sent to the operator that all the insertions were good, or an error message being recorded for later review should any of the insertions not meet the software criteria of the servo loop software 52. As will be recognized fully completing the process of Z-pinning the hat stiffener 22 to the laminate 24 would entail programming the PLC 42 to actuate the robot 50 as needed to cause the anvil 38 of the ultrasonic horn 30 to sequentially act against all of the Z-pins 20 of all of the carrier pre-forms 10 in a manner which ultimately results in all of the Z-pins 20 being advanced through the flange portions 28 of the hat stiffener 22 and into the underlying laminate 24.

Those of ordinary skill in the art will recognize that the above-described universal parameters of the present invention were developed for an anvil 38 of a prescribed area and Z-pins 20 which are of a prescribed pin density and pin diameter within the carrier pre-form 10. In this regard, it is contemplated that the number of Z-pins 20 that are simultaneously inserted using the aforementioned parameters is in the range of approximately 150-200 Z-pins 20 minimum. For a given area of the anvil 38, the load per Z-pin 20 increases with a decrease in the number of Z-pins 20. If there is less than approximately 150 Z-pins 20, the system may "over insert" the Z-pins 20 since the fifty pound trigger force is never reached and the system either times out or reaches the maximum insertion depth. Thus, the forty and fifty pound values described above would depend on the area of the anvil 38 and the density and diameter of the Z-pins 20 in the carrier pre-form 10, and may be modified as needed to accommodate density and diameter variations in the Z-pins 20. Likewise, the insertion speeds described above may be modified as needed to accommodate density and diameter variations in the Z-pins 20.

Further in accordance with the present invention, there is provided a technique which may be used in conjunction with the automated insertion process described above to automatically perform a required full depth inspection and alert the operator of the robot 50 should a non-acceptable Z-pin insertion occur. As explained above, the automated insertion process of the present invention employs the use of a set of universal insertion parameters, which in turn facilitate the implementation of a two-speed insertion process based on certain insertion force thresholds. The automated inspection technique of the present invention automatically checks to see if the insertion speed has dropped from the initial rate of approximately 0.25 inches per second to the requisite lower level of approximately 0.050 inches per second attributable to the insertion force applied by the ultrasonic horn 30 to the Z-pins 20 reaching about forty pounds, and further whether the requisite final insertion force of about fifty pounds was achieved during the insertion process. These particular parameters are automatically checked by analyzing data as it is generated during the insertion process. As explained above, such data is generated by the load cell 40 and transmitted to the PLC 42.

Figure 6A:
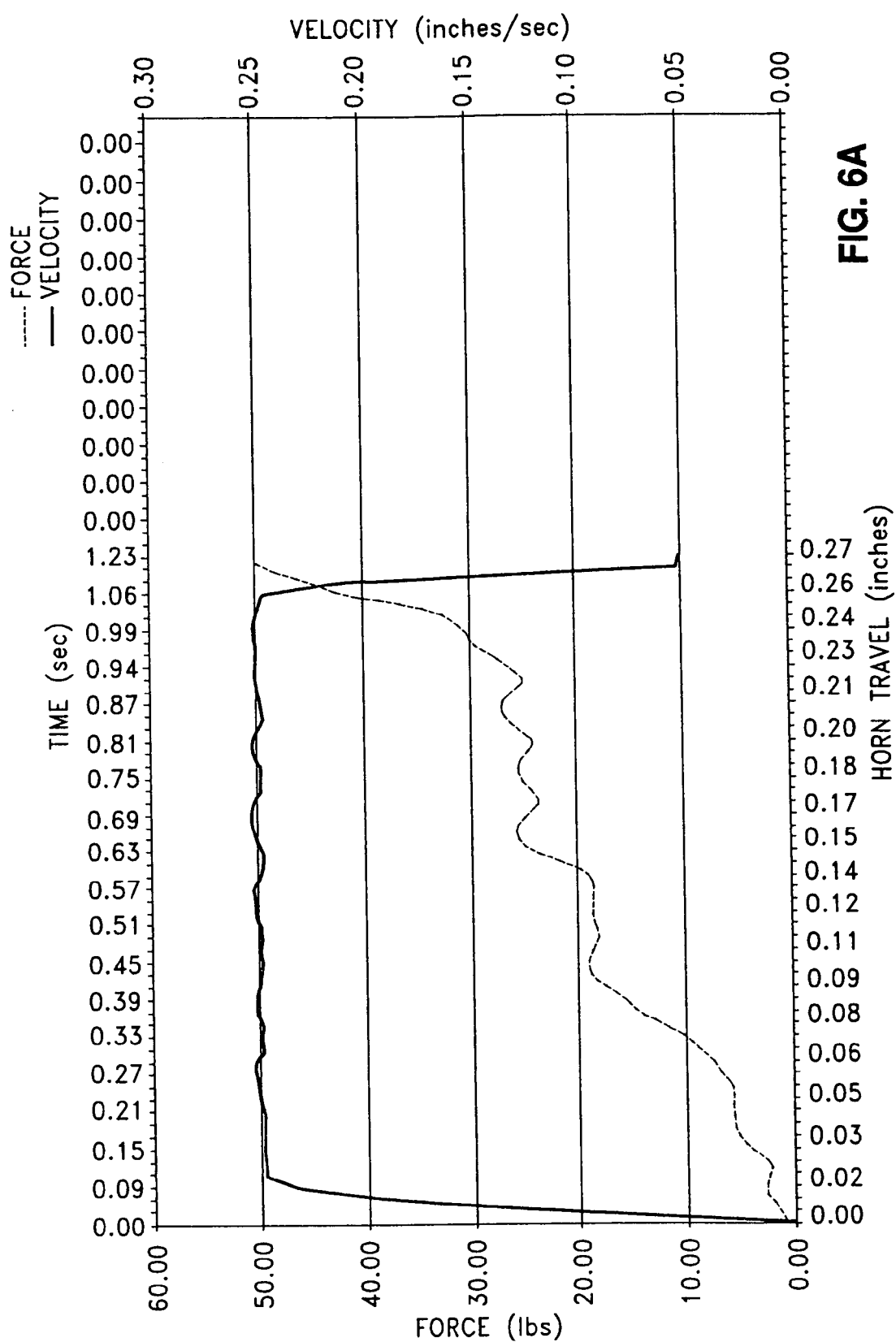
FIGS. 6A-6E are graphical depictions illustrating the interrelationship between insertion force and insertion speed as it pertains to acceptable and unacceptable Z-pin insertions facilitated through the use of the insertion process of the present invention.
Figure 6B:
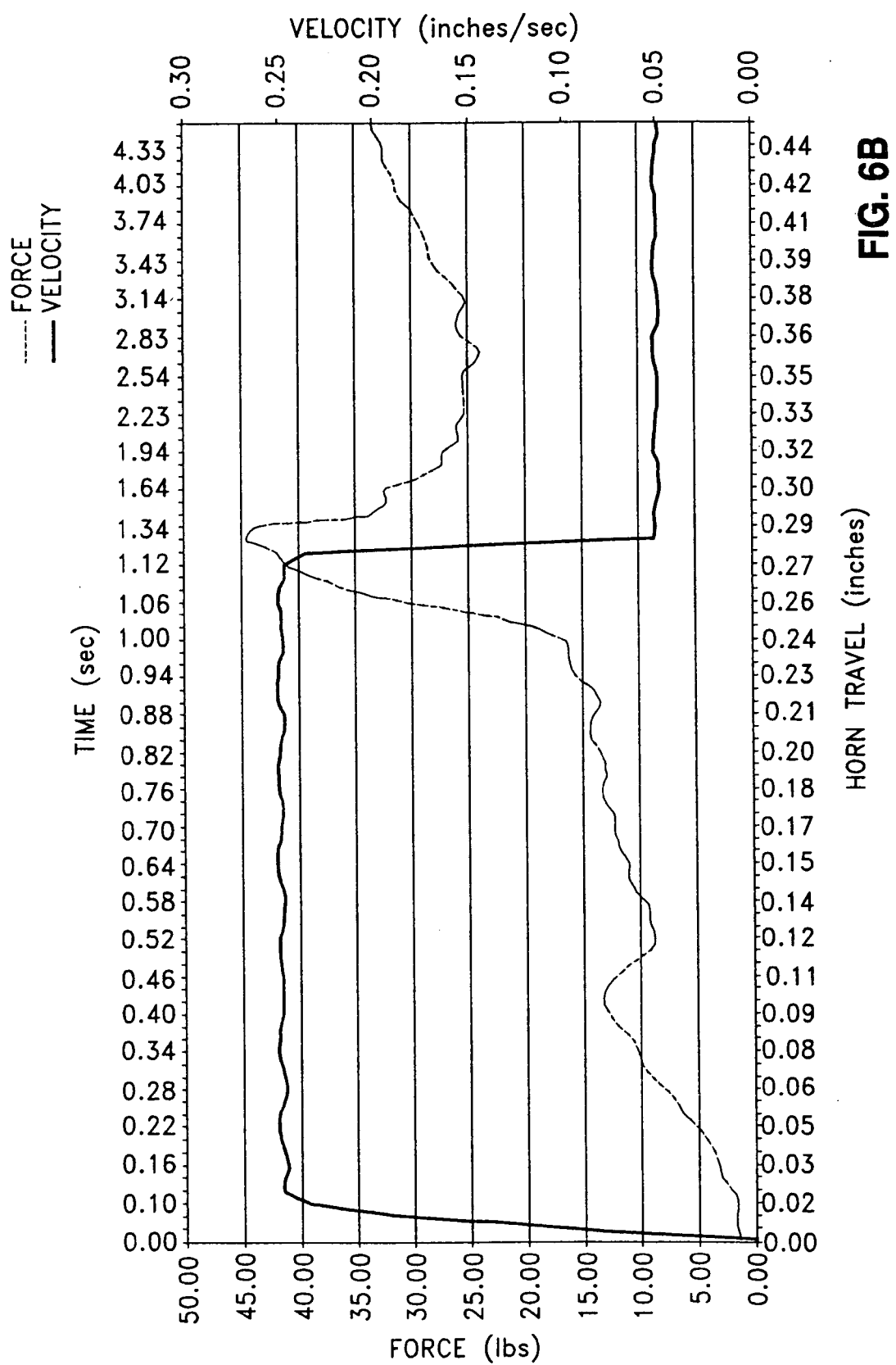
Figure 6C:
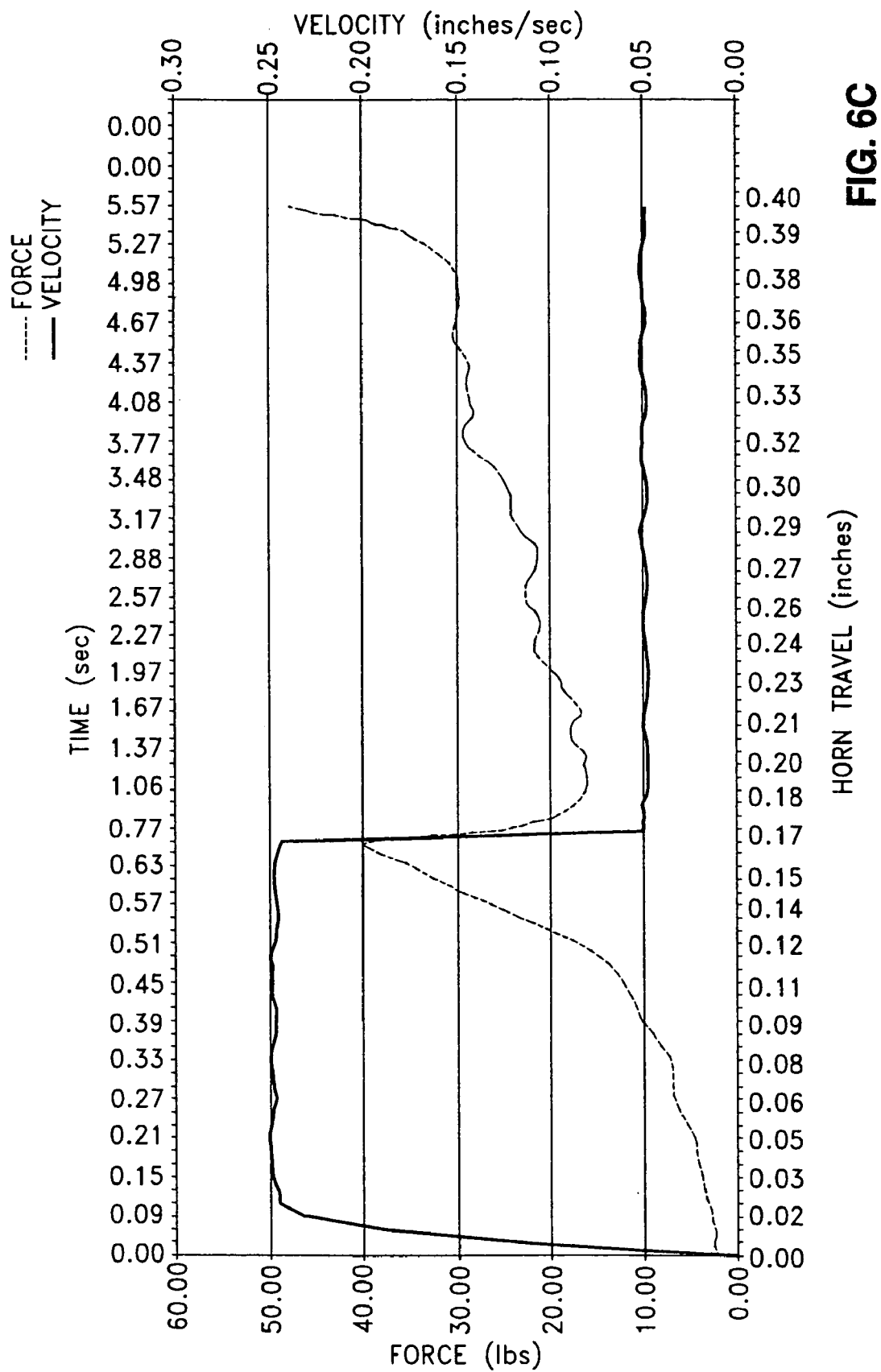
Figure 6D:
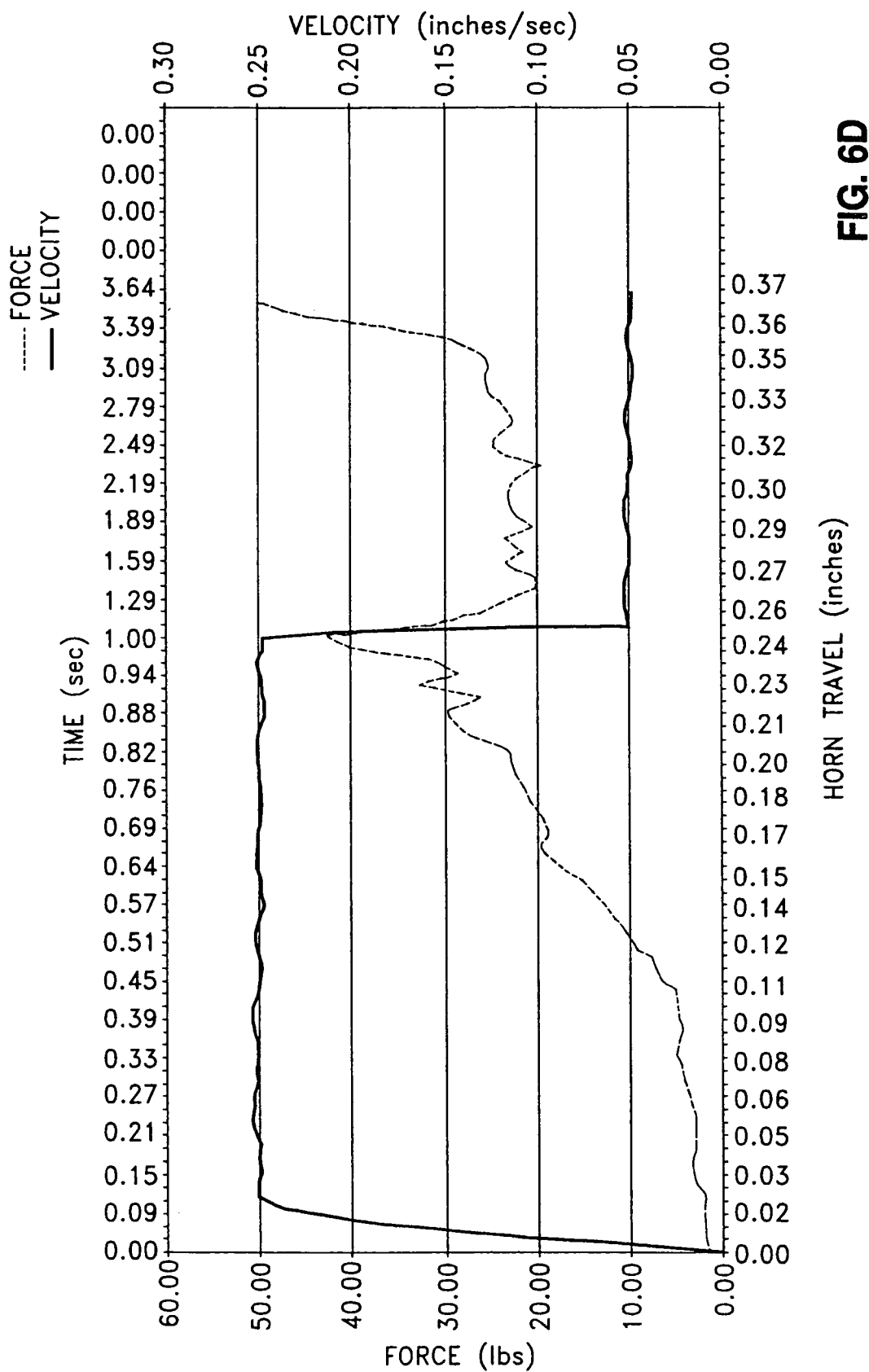
Figure 6E:
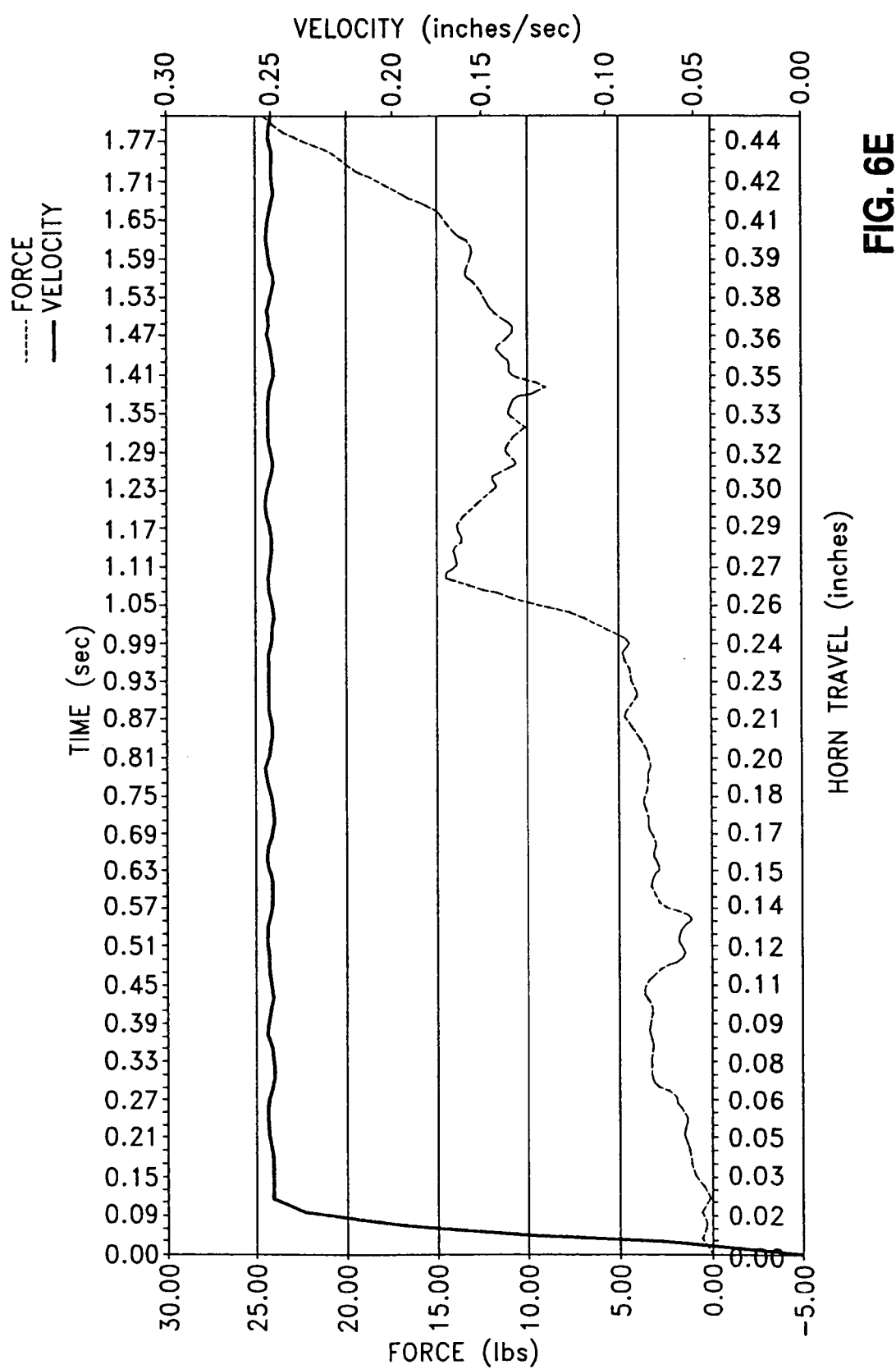

As such, the automated inspection technique of the present invention relies on the principle that an acceptable insertion is always produced when 1) the insertion speed is reduced from the initial rate of approximately 0.25 inches per second to the requisite lower level of approximately 0.050 inches per second, and 2) the insertion force limit threshold of approximately fifty pounds is also reached. For unacceptable Z-pin insertions, the first condition (1) may be met, but both conditions (1 and 2) are never met. The interrelationship between insertion force and insertion speed as it pertains to acceptable and unacceptable Z-pin insertions using the automated inspection technique of the present invention in graphically depicted in FIGS. 6A-6E. In this regard, FIGS. 6A and 6D depict interrelationships which are indicative of acceptable insertions, with FIGS. 6B, 6C and 6E depicting interrelationships which are indicative of unacceptable insertions. It is contemplated that the PLC 42 will be programmed to provide a signal which alerts the operator of the robot 50 that an unacceptable insertion has occurred, and/or provide an alert message in the insertion data generated by the insertion system 29 for quality purposes. With the implementation of the automated inspection technique of the present invention, it is contemplated that manual inspections for full depth insertion of the Z-pins 20 may be eliminated from the production process, thus providing substantial cost savings.

Figure 7:
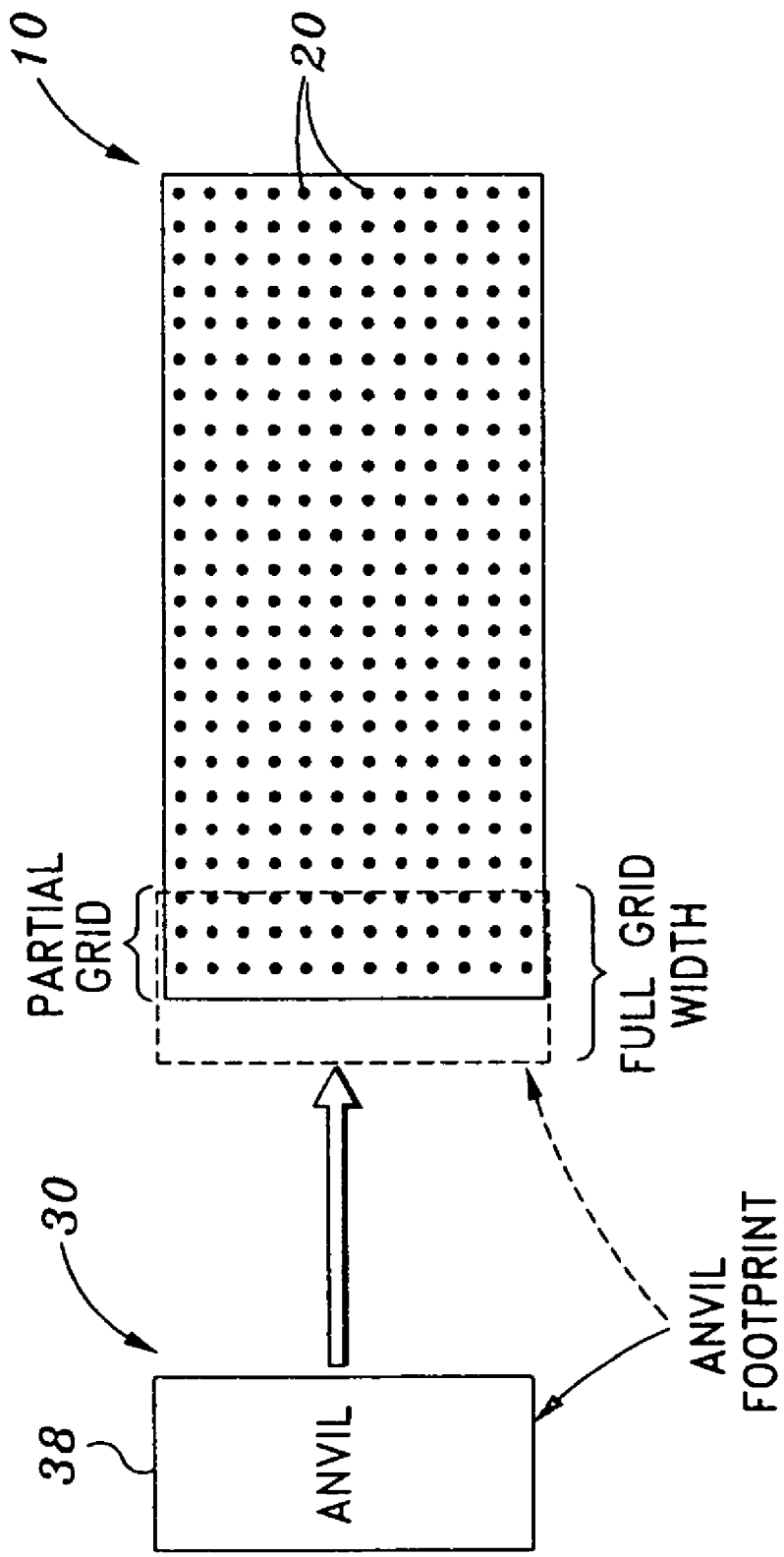
FIG. 7 is a schematic view illustrating the distinction between full and partial grid insertions through the use of the ultrasonic horn in the insertion system and process of the present invention.

Referring now to FIG. 7, as described above, during the implementation of the automated Z-pin insertion process through the use of the system 29 shown in FIG. 3, the robot 50 effectively maneuvers the anvil 38 of the ultrasonic horn 30 to a prescribed location or position relative to one of the carrier pre-forms 10 (i.e., the first position P1 shown in FIG. 2A). Subsequent to this initial positioning, the robot 50 is directed to actuate the anvil 38 to a second position P2, with such movement triggering the start of the insertion process of the Z-pins 20 from within the carrier pre-form 10 through the corresponding flange portion 28 and into the underlying laminate 24. As the Z-pinning process commences, the ultrasonic horn 30 is moved downwardly along the vertical axis Z shown in FIG. 2A by the robot 50 such that the anvil 38 comes into direct contact with a portion of the carrier pre-form 10 in the manner shown in FIG. 2B. At the beginning and end of each carrier pre-form 10, a partial grid insertion usually occurs. As indicated above, a partial grid insertion occurs when a portion of the anvil 38 of the ultrasonic horn 30 extends beyond one of the sides or peripheral edge segments of the carrier preform 10 as shown by the phantom lines labeled "anvil footprint" in FIG. 7. This is in contrast to a full grid insertion which occurs when the footprint of the entire anvil 38 lies within or rests upon the exposed top surface of the carrier pre-form 10. Also included in FIG. 7 are legends and corresponding reference lines which provide a visual depiction of a partial grid and a full grid as relates to the footprint of the anvil 38 and the arrangement of Z-pins 20 within the carrier pre-form 10.

As also explained above, the system 29 uses a universal set of insertion parameters for all automated insertions and material conditions, thus greatly simplifying the production environment. By using the universal insertion parameters, the system 29 applies the same insertion force/insertion speed to insert the Z-pins 20 no matter what the conditions are. The above-described feedback system uses force feedback to provide information on the insertion process and to switch the insertion speed between two values in the aforementioned manner. Though the position feedback capability of the system 29 provides a measure of the insertion depth from the start of the insertion to the termination of the insertion, such depth can vary considerably due to the manual placement of the carrier pre-forms 10 on the flange portion 28 of the hat stiffener 22, thus making it difficult to determine how deep the Z-pins 20 are driven into such structure. In this regard, it is desirable for the Z-pins 20 to be driven through the uncured structure until they contact the bond tool or barrier sheet 57, thus completing what is referred to as a full depth insertion. However, as indicated above, when inserting the Z-pins 20 into any composite structure, the system 29 is not able to detect the difference between a full grid and a partial grid insertion with just the force feedback provided by the load cell 40. Neither can the system 29 detect when inferior Z-pins 20 are present in the carrier pre-form 10. Inferior Z-pins 20 are unable to carry the normal insertion forces exerted by the system 29 and crumble instead of inserting fully into the corresponding composite structure. Though, during normal full grid insertions, the system 29 works extremely well, there are typical occurrences of partial grid insertions at the beginning and end of each carrier pre-form 10. The potential drawbacks associated with such partial grid insertions are described above.

Figure 8:
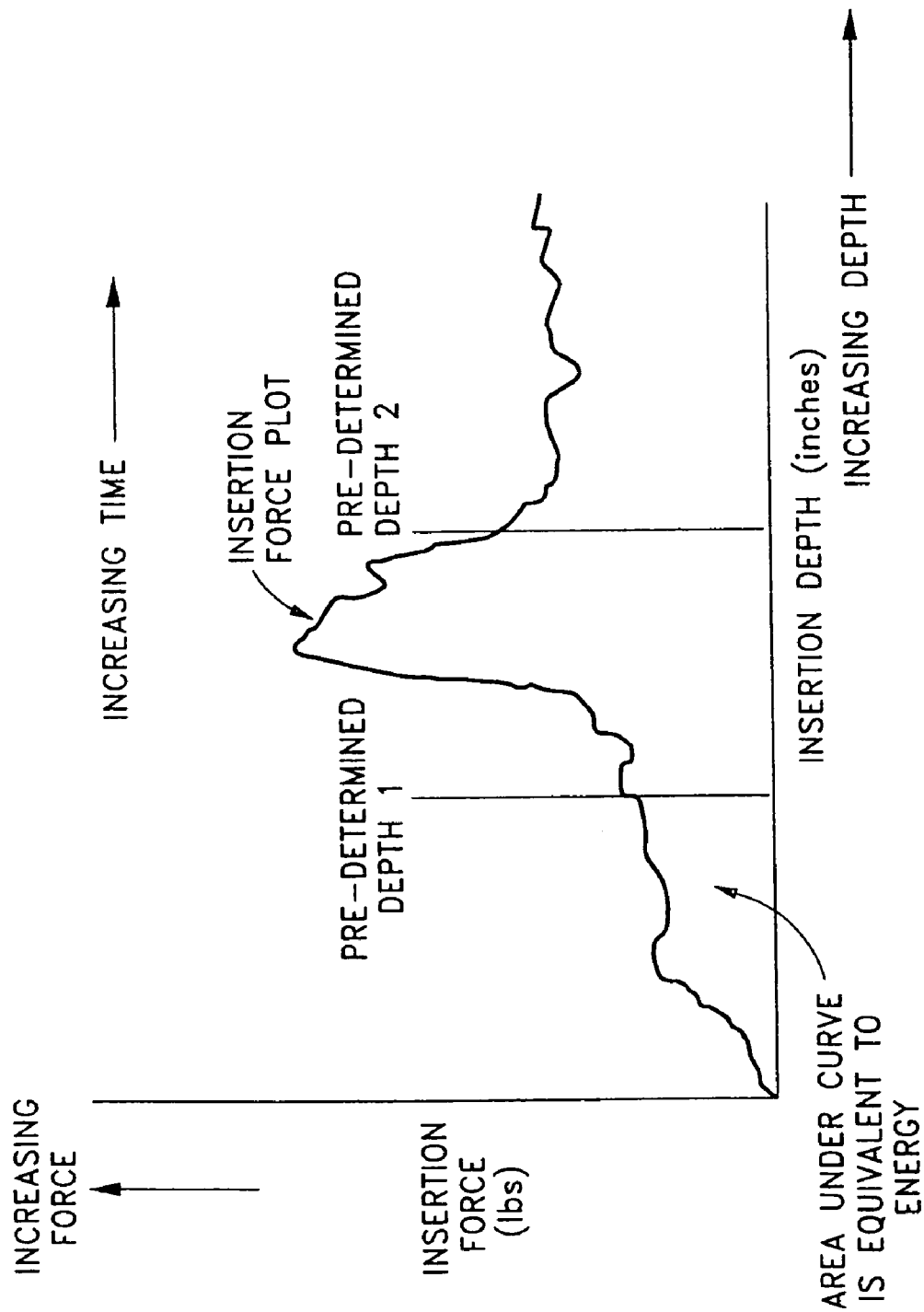
FIG. 8 is a graphical depiction illustrating the interrelationship between insertion force and insertion depth as it pertains to a typical partial grid insertion force curve in accordance with the prediction technique of the present invention

In view of the foregoing, further in accordance with the present invention, there is provided a method of detecting the occurrences of partial grid insertions or inferior/defective Z-pins 20 during the implementation of the automated insertion process. In this respect, the detection method of the present invention is adapted not only to detect these undesirable conditions, but actually to predict them before their occurrence so as to prevent the same. More particularly, the detection method of the present invention involves monitoring the insertion energy during the initial insertion phase previously described in relation to the Z-pins 20, and comparing such insertion energy to an empirically derived value for "good" insertions, thereafter allowing the insertion process to continue to a predetermined additional depth before terminating the same. The insertion energy is calculated by essentially integrating the area under the curve shown in FIG. 8. This is done by cumulatively summing the insertion force and multiplying it by the insertion time, yielding the cumulative energy. At a specified, predetermined depth (depth 1 shown in FIG. 8) the energy accumulation is stopped and a value at depth 1 stored and compared to an empirically derived value. If the value is less than the empirical value, the insertion energy is too low which indicates that either a partial grid is being encountered, or defective Z-pins 20 are being inserted. The insertion is allowed to continue until another empirically derived predetermined depth (depth 2 shown in FIG. 8) is reached, at which time the insertion is terminated. The second depth (i.e., depth 2) is necessary for the continued insertion of partial grids to ensure that the Z-pins 20 are fully inserted. Depth 2 is a function of the laminate thickness to ensure full depth insertions.

The above-described technique is able to predict that a partial grid or inferior/defective Z-pins 20 are being inserted, and prevents a condition referred to as over insertion whereby the tops of the Z-pins 20 are crushed too much on top of the carrier pre-form 10. The over insertion causes the ultrasonic horn 30 to overheat, melts the polystyrene foam component of the carrier pre-form 10, and slows down the insertion cycle time as explained above. As also previously described, aesthetically, an over insertion results in a darkened upper surface where the Z-pins 20 have crumbled, and further increases the amount of graphite dust in the area which can short out unprotected electronic circuitry. A further concern is the temperature rise of the ultrasonic horn 30 which can cause additional problems if allowed to go unchecked. It is contemplated that the first depth (depth 1) described in relation to the detection technique may correspond to the first distance D1 shown and described in relation to FIG. 2A, with the second depth (depth 2) corresponding to second distance D2 also shown and described in relation to FIG. 2A.

This disclosure provides exemplary embodiments of the present invention. The scope of the present invention is not limited by these exemplary embodiments. Numerous variations, whether explicitly provided for by the specification or implied by the specification, such as variations in structure, dimension, type of material and manufacturing process may be implemented by one of skill in the art in view of this disclosure.

What is claimed is:

1. A method of predicting an over insertion of at least one Z-pin into a composite laminate and determining whether the Z-pin is defective, the method comprising the steps of:
    a) positioning at least one Z-pin upon the composite laminate;
    b) applying an insertion force to the Z-pin at a level sufficient to commence an insertion process wherein the Z-pin is driven into the composite laminate to a first insertion depth;
    c) monitoring the insertion force applied to the Z-pin during the insertion thereof to the first insertion depth;
    d) calculating an insertion energy level applied to the Z-pin during the insertion thereof to the first insertion depth; and
    e) comparing the insertion energy level to an empirically derived value.

2. The method of claim 1 further comprising the step of:
    f) maintaining the application of the insertion force to the Z-pin at a level sufficient to drive the Z-pin into the composite laminate to a second insertion depth.

3. The method of claim 2 wherein step (f) is completed only if the insertion energy level is below the empirically derived value.

4. The method of claim 2 wherein the second insertion depth is empirically derived as a function of a thickness of the composite laminate.

5. The method of claim 2 further comprising the step of:
    g) terminating the application of the insertion force to the Z-pin upon the Z-pin reaching the second insertion depth.

6. The method of claim 1 wherein the calculation of the insertion energy level in step (d) is discontinued when the Z-pin reaches the first insertion depth.

7. The method of claim 6 wherein application of the insertion force to the Z-pin in step (b) is paused when the Z-pin reaches the first insertion depth.

8. The method of claim 1 wherein an ultrasonic horn is used to apply the insertion force to the Z-pin in step (b).

9. The method of claim 1 wherein step (d) comprises calculating the insertion energy level by multiplying the insertion force by a measure of time needed for the Z-pin to reach the first insertion depth.

10. The method of claim 1 wherein step (a) comprises embedding the Z-pin into a carrier pre-form which is positioned upon the composite laminate.

11. A method of predicting over insertions of a plurality of Z-pins into a composite laminate and determining whether any one of the Z-pins is defective, the method comprising the steps of:
   a) positioning the Z-pins upon the composite laminate;
   b) applying an insertion force to the Z-pins at a level sufficient to commence an insertion process wherein the Z-pins are concurrently driven into the composite laminate to a first insertion depth;
   c) monitoring the insertion force applied to the Z-pins during the insertion thereof to the first insertion depth;
   d) calculating an insertion energy level applied to the Z-pins during the insertion thereof to the first insertion depth; and
   e) comparing the insertion energy level to an empirically derived value.

12. The method of claim 11 further comprising the step of:
   f) maintaining the application of the insertion force to the Z-pins at a level sufficient to drive the Z-pins into the composite laminate to a second insertion depth.

13. The method of claim 12 wherein step (f) is completed only if the insertion energy level is below the empirically derived value.

14. The method of claim 12 wherein the second insertion depth is empirically derived as a function of a thickness of the composite laminate.

15. The method of claim 12 further comprising the step of:
   g) terminating the application of the insertion force to the Z-pins upon the Z-pins reaching the second insertion depth.

16. The method of claim 11 wherein the calculation of the insertion energy level in step (d) is discontinued when the Z-pins reach the first insertion depth.

17. The method of claim 16 wherein application of the insertion force to the Z-pins in step (b) is paused when the Z-pins reach the first insertion depth.

18. The method of claim 11 wherein an ultrasonic horn is used to apply the insertion force to the Z-pins in step (b).

19. The method of claim 11 wherein step (d) comprises calculating the insertion energy level by multiplying the insertion force by a measure of time needed for the Z-pins to reach the first insertion depth.

20. The method of claim 11 wherein step (a) comprises embedding the Z-pins into a carrier pre-form which is positioned upon the composite laminate.

* * * * *